United States Patent
Rensing et al.

(10) Patent No.: US 10,372,567 B2
(45) Date of Patent: Aug. 6, 2019

(54) AUTOMATIC FAULT DETECTION AND DIAGNOSIS IN COMPLEX PHYSICAL SYSTEMS

(71) Applicant: Cimetrics Inc., Boston, MA (US)

(72) Inventors: Paul Rensing, Newton, MA (US); Keith Corbett, Richmond Hill (CA); Charles Frankston, Newton, MA (US)

(*) Notice: Subject to any disclaimer, the term of this patent is extended or adjusted under 35 U.S.C. 154(b) by 931 days.

(21) Appl. No.: 14/624,675

(22) Filed: Feb. 18, 2015

(65) Prior Publication Data

US 2015/0235141 A1    Aug. 20, 2015

Related U.S. Application Data (60) Provisional application No. 61/941,162, filed on Feb. 18, 2014.

(51) Int. Cl.
  - G06F 11/22 (2006.01)
  - G06N 5/02 (2006.01)
  - G05B 23/02 (2006.01)

(52) U.S. Cl.
  CPC .......... G06F 11/22 (2013.01); G05B 23/0224 (2013.01); G05B 23/0278 (2013.01); G06N 5/025 (2013.01)

(58) Field of Classification Search
  None
  See application file for complete search history.

(56) References Cited

U.S. PATENT DOCUMENTS

| | | | | |
|---|---|---|---|---|
| 6,795,935 | B1* | 9/2004 | Unkle | G05B 23/0275 340/438 |
| 8,731,724 | B2* | 5/2014 | Drees | G05B 15/02 700/276 |
| 2012/0185728 | A1* | 7/2012 | Guo | F24F 11/0009 714/26 |

FOREIGN PATENT DOCUMENTS

CA    2344908 A1    1/2002

OTHER PUBLICATIONS

Singhal, Ashish, and Dale E. Seborg. "Clustering multivariate time-series data." Journal of chemometrics 19.8 (2005): 427-438.*

* cited by examiner

*Primary Examiner* — Li B. Zhen
*Assistant Examiner* — Daniel T Pellett
(74) *Attorney, Agent, or Firm* — Stanzione & Associates, PLLC; Patick Stanzione (57) ABSTRACT

A fault detection and diagnosis (FDD) system designed to automatically and efficiently determine the true fault underlying a set of symptoms, presenting the operator with a clear cause and effect diagram for all faults and symptoms. An Event Cluster is used to group related symptoms and causes, potentially across multiple pieces of equipment, and establish a cause and effect relationship chain.

14 Claims, 3 Drawing Sheets

AUTOMATIC FAULT DETECTION AND DIAGNOSIS IN COMPLEX PHYSICAL SYSTEMS

REFERENCE TO RELATED APPLICATIONS

This application claims one or more inventions which were disclosed in Provisional Application No. 61/941,162, filed Feb. 18, 2014, entitled "A system and method for automatically detecting faults and diagnosing faults, and recommending optimizations in complex physical systems". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of automated fault detection and diagnoses of complex systems. Examples of complex systems would include, but are not limited to, Heating Ventilation and Air Conditioning (HVAC) systems for large commercial buildings, industrial process control systems, and engines of various sorts (car engines, gas turbines).

Description of Related Art

Many modern technological systems consist of a multiplicity of components that interact in a complex ways. Examples include engineered HVAC systems, industrial process control systems, engines with a substantial number of components (e.g. a typical automobile or aircraft engine), etc. Modern systems typically have digital controls. One or more computers constitute the "control" system. These computers are capable of getting information from each component about the operating state of the components (for example, the temperature in a room or a combustion chamber, the position of a valve or switch), and sending commands to each component (for example, close a valve, reduce a voltage). These control systems are programmed to operate the system in the desired fashion (for example, maintain comfort in conditioned spaces), while operating as efficiently as possible (use the least energy).

Almost all modern engineered systems above a non-trivial level of complexity are controlled by computer(s). The components of the system, such as valves, motors, fans, etc. are commanded by computers. The computer will also (almost always) be connected to sensors that can measure physical characteristics, such as temperature, humidity, pressure, and velocity (both linear and rotary, depending on what is being measured).

It is challenging to keep these systems operating correctly and optimally. Any number of things can go wrong, from the failure of individual components to errors in the programming of the control system. These problems can cause the system to fail in part or in whole, or cause the system to operate less optimally than it could—wasting energy, operating poorly, and potentially causing undue wear and tear on components.

It is often difficult to diagnose the failure modes of these systems. A failure might not be caused by the component closest to the apparent failure. For example, if an HVAC system fails to maintain the temperature in a room, the immediate cause of failure might be an air damper that is not in the correct position. But a less immediate cause of failure could be several levels removed from the immediate air supply to the room—for example, the central plant might not be supplying sufficient hot or cold water to the heat exchange unit. Sometimes symptoms are elusive or intermittent. Failures might only occur under certain conditions or during certain operating modes. A system that appears to be functioning properly (e.g. the correct temperature is being maintained), but sub-optimally (consuming more energy than necessary) will often not be diagnosed at all.

Properly analyzing these complex systems generally takes a lot of skill and experience. It is often not cost-effective to assign people with the requisite skill and experience to examine a system that is mostly working, even if that system has multiple small failures that waste energy or cause the system to operate in a less than optimal fashion.

This makes automated detection and analysis of faults and suboptimal operation highly desirable. It is much more cost effective to use computational resources to analyze systems than skilled engineers.

A complex system could have a large number of symptoms active at any time. In a typical HVAC system, the operator console might show all of these symptoms—commonly known as "alarms". It is common for the operator workstation on a mid-sized commercial HVAC system to display several screens of such alarms—lots of red lights. Often, the vast majority of these symptoms are due to a small number of root causes. For example, failure to maintain desired temperature in one or more zones could be due to a problem with the supply heating or cooling media, but a typical HVAC operator console will show alarms for every space and might not even show an alarm for the chilled water supply.

Most existing automated fault detection systems fall into two categories:

The first category is systems using "if . . . then . . . else" rules, which do not scale well. Individual rules must be written for every possible fault. Tracing faults back to a root cause requires explicitly nested rules that go back several steps. With this approach, the number of rules multiply exponentially for each back-trace step.

The second category of systems requires developing a mathematical model for each system being examined. Creating an accurate model is a labor intensive process that may involve capturing more information than the original design contained (for example the original design of an HVAC system may not have any formal calculations for parameters like envelope leakage or solar warming). They may be difficult to tune across the full range of operating modes.

A 2010 Canadian patent, CA2344908 "Model based fault detection and diagnosis methodology for HVAC subsystems", by Siemens Building Technologies, Inc., shows a system which requires preparation of an extensive "base case" lookup tables, specific to each system being analyzed over each mode of operation. As stated in the Siemens patent, "In developing the base case look-up table, measurement data for a wide variety of base-case operating conditions is compiled in a table which is accessed by the thermodynamic data reduction program. As will be appreciated by one of ordinary skill in the art, it is advantageous to collect measurement data for as wide a variety of operating conditions as possible in order to improve the accuracy of the interpolated CQ values."

SUMMARY OF THE INVENTION

The fault detection and diagnosis (FDD) system is designed to automatically and efficiently determine the true fault underlying a set of symptoms, presenting the operator with a clear cause and effect diagram for all faults and symptoms. An Event Cluster is used to group related symptoms and causes, potentially across multiple pieces of equipment, and establish a cause and effect relationship chain.

The system collects data from the monitored system at periodic intervals. The system analyzes the collected data using a library of templates to identify potential faults. The analysis provides a means for ranking the likelihood of faults from most likely (to be a real fault) to least likely. The system performs "root-cause analysis"—reporting on the fault or faults that cause other faults. This considerably reduces clutter and makes the reported faults more useful for the end-user.

DETAILED DESCRIPTION OF THE INVENTION

Data Collection

Figure 3:
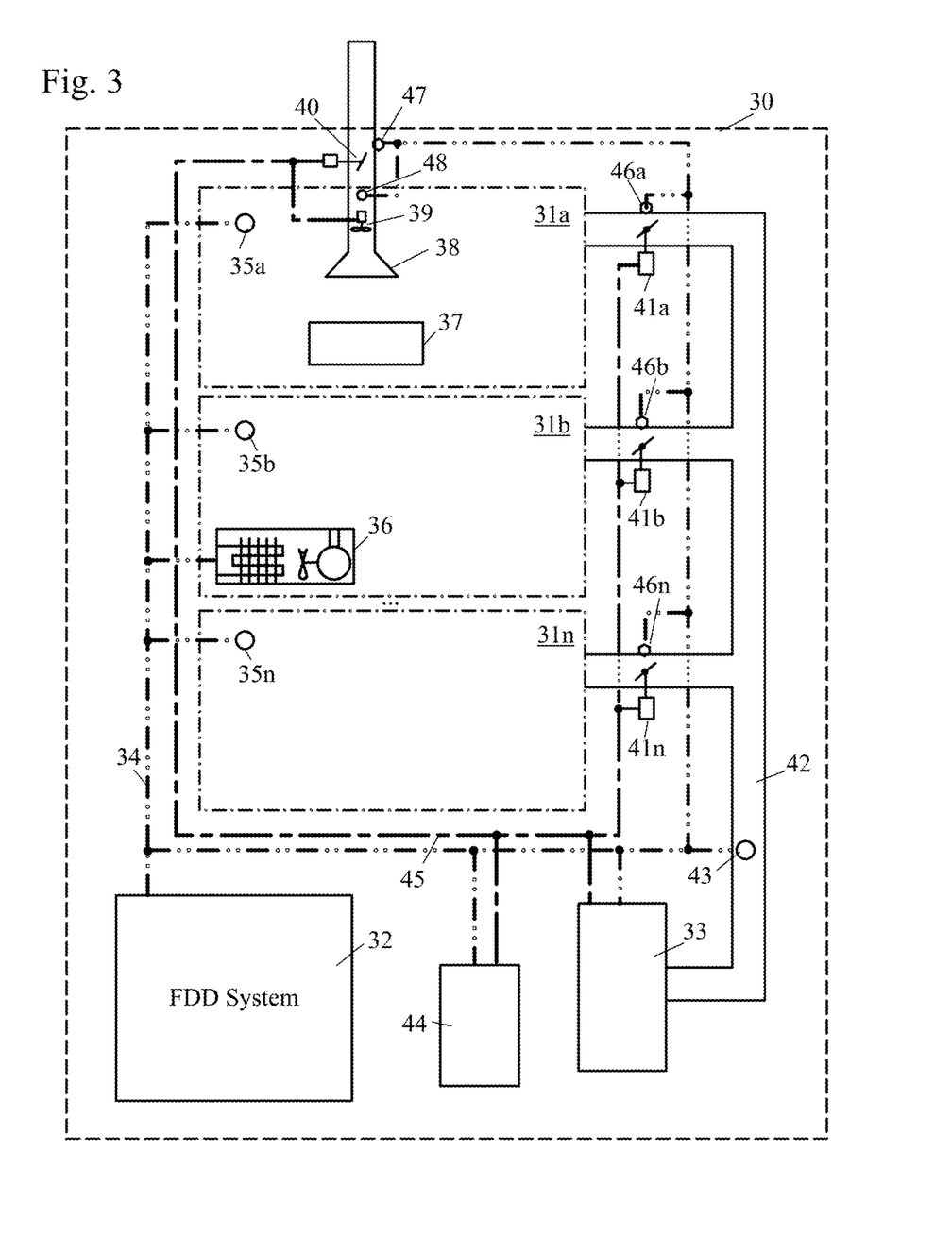
FIG. 3 is a block diagram of an example HVAC system which might be used with the system and method of the invention

As can be seen in FIG. 3, the system of the invention can be used in, for example, an HVAC system in a large building 30 having many rooms 31a-31n. A central control computer 44 controls the operation of the system as a whole through a building network 45. The building might have a central air-handling unit 33 which distributes heated or cooled air through the building through air ducts 42, with air regulation by a plurality of air vents 41a-41n. In rooms such as 31a which house laboratory equipment 37, fume hoods 38 would be provided, equipped with fans 39 and possibly dampers 40, and these can be connected to the central controller 44 via network 45 as well. Some of the rooms, such as 31b, might have additional equipment, such as one or more local heat pumps 36, which might not be controlled by the central controller 44.

A number of sensors are distributed throughout the building 30. For example, each room 31a-31n might have an ambient conditions sensor 35a-35n. A sensor 43 could be located in the air duct 42 to measure one or more parameters such as pressure, temperature or air flow. Sensor 48 is located in the fume hood 38 duct to measure air flow or pressure and position sensor 47 is located next to the damper 40, to confirm the proper operation of the fume hood 38, fan 39 and damper 40. Position sensors 46a-46n could be included to sense if valves 41a-41n were closed or open. The central air handling unit 33 and independent equipment such as the heat pump 36 could be provided with sensors as well to monitor one or more parameters of the equipment for fault detection purposes.

The sensors can be directly wired to an FDD system controller 32, or they can be connected to a system network 34 as shown in FIG. 3. The central control computer 44 will also preferably be connected to the network 34 for communication with the FDD system controller 32. The system network 34 can be the same physical network as the building network 45, or they can be separate networks as shown in FIG. 3.

The FDD system controller 32 will collect data from most (or preferably all) sensors 35a-35n, 43, 46a-46n, 47, 48 and set points in the target system. If the sensors are networked 34, they can be polled directly. Preferably, this polling will be done on a separate sensor network 34 without interfering with the building automation system's control computers 44. In other cases, the FDD system 32 can be integrated into the control computer 44, and data might be collected on the same network 45 as is used for HVAC control.

The FDD system will preferably collect data at periodic intervals. For example, in analyzing an HVAC system, a data collection of interval of 15 minutes is often desirable. More frequent data collection would usually not improve the analysis, as the physical processes for HVAC do not operate on that fast a time scale. On the other hand, significantly less frequent data collection might miss certain events and diminish the quality of analysis. For an industrial control system, more frequent data collection—polling every minute or perhaps more frequently is likely to be necessary because of the speed of the underlying processes.

Instrumentation Sufficiency

There is a certain minimum level of information needed to perform the FDD analysis. In general, a larger, more complex system will have more points than a smaller, simpler system. As an example, for a typical twenty story office building, one would expect several thousand points of data. A larger office building 30 would have more sensors than a smaller building. A laboratory space 31a, with more stringent HVAC requirements, and additional equipment (fume hoods 38 and the like) might have two to three times as many points as an office space 31b-31n of the same size.

A single automobile engine might have thirty or forty points that are critical to engine performance. An eight cylinder car engine would have more points than a four cylinder car engine.

The target system preferably has an appropriate level of instrumentation (i.e. have appropriate sensors). Ideally, every physical process in the system would have full measurements (temperature, pressure, and velocity on all inputs and outputs, closed-loop indicators on the status of all actuators, etc.). In some industries (particularly building HVAC), only a subset of the possible instrumentation will be installed because of cost-saving measures. This is generally not a problem; for example, one can substitute measurements from the output of the preceding unit for direct measurements of the input of the following unit, but there is a point beyond which analysis cannot be done if the instrument is insufficient.

The amount of instrumentation required varies according to the type of equipment being analyzed and the particular analysis templates being used. It is possible that, for a given target system, and a given set of analysis templates, the target system could be sufficiently well instrumented for some analysis templates and insufficiently instrumented to permit other analysis. In this case, the FDD system will use those templates that have sufficient data.

Configuration and Setup

In order to analyze the target system, each point is first labeled, or categorized. The system needs to know several things about each data point:

The type of data point, e.g. temperature, fan speed, humidity measure, air flow, etc.

The units used for the data point (e.g. temperature in Fahrenheit or Celsius, pressure in pounds per square inch or inches of water)

The piece of equipment that the data point is part of

The point's function within the piece of equipment (for example, an Air Handling Unit 33 might have several temperature points—input air temperature, output air temperature, input coolant temperature, output coolant temperature, and perhaps some intermediate measurements as well).

There is also a class of data points called "static points". These points are not collected from actual sensors, but rather are constant attributes of the target system. For example, the operating capacity of a fan would be a static data point. For many calculations, the FDD system needs to know the volume of air (in a unit like CFM—cubic feet per minute) being pushed by the fan, but the system might only have a point for the power (i.e. Watts) supplied to the fan. In that case, the CFM can be computed (approximately) as a function of the fan capacity and the power, relative to the max operating power of the fan (see Step 2: Perform time-series calculations on data below).

Pattern Matching

In additional to classifying each data point, each piece of equipment also has information associated with it:

The equipment type, e.g. chiller, boiler, AHU, VAV

The equipment configuration, including capacities and other information specific to the actual equipment instance The points associated with each piece of equipment The topology of the system—i.e. the interconnection of the media flows—which air handlers are connected to the output of which chillers or boilers, which VAVs are connected to which AHUs, etc.

The categorization system should be rich enough to support the pattern matching functions required by the FDD system, which include the following:

The ability to match equipment types and subtypes. For example, in an HVAC system, match all air-handling units (AHU), or match a sub-type of air-handling units (for example: an air-handling unit that uses chilled water—AHU_CHW).

The ability to match pieces of equipment that are parts of other pieces of equipment. For example: AHU_HP/SA/HC_E—an Electric Heating Coil that is part of the Supply Air stream of a Heap Pump type Air Handling Unit.

The ability to match multiples of units, or a list of alternatives. Example: AHU_.*—match any kind of Air Handling Unit, or AHU_(CHW|HP) matches both Chilled Water and Heat Pump Air Handling Units.

The ability to match points. Example—AHU_CHW/SA/DAT—the Discharge Air Temperature of the Supply Air Stream connected to a Chilled Water Air Handling Unit. Point matching can also use regular expression patterns and could match more than one point.

The ability to match media flows by topology. Example—IA/SA/DA—the Discharge Air Stream of the Supply Airstream that is the Input (IA) of the current piece of equipment.

Process Steps

Figure 1:
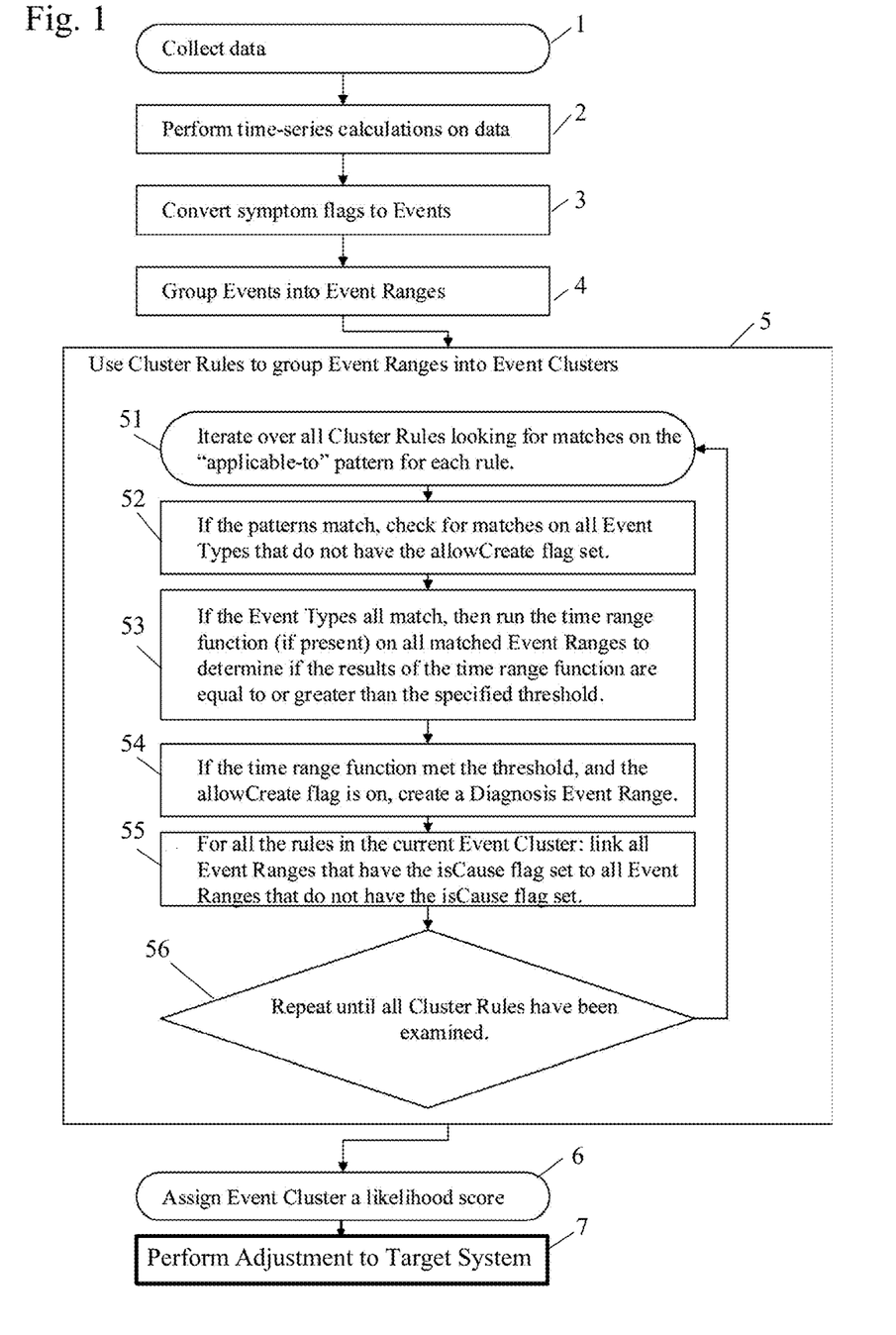
FIG. 1 shows a flowchart of the automated fault detection process

Once all the prerequisites are setup properly, the FDD process can be performed according to the following steps, as shown in the flowchart of FIG. 1:

Step 1: Collect data
Step 2: Perform time-series calculations on data
Step 3: Convert symptom flags to Events
Step 4: Group Events into Event Ranges
Step 5: Use Cluster Rules to group Event Ranges into Event Clusters
Step 6: Assign Event Cluster a likelihood score
Step 7: Perform an adjustment to the Target System, based on the results of the preceding steps.

Step 1: Step 1: Collect Data

Once the FDD system is configured, data collection can commence. The target system's points are polled at periodic intervals (as previously discussed in "Data Collection"). The data value from each point is retained in a database, and each value is marked with the date and time that the point was sampled (a "time stamp"). It is important that the time stamps be reasonably accurate, relative to the polling interval. It is also important that the FDD system continue to operate even if there are missing data values.

It is intended that the FDD system operates continuously and indefinitely once configured. Although it is possible to analyze data over limited periods of time, the true value of the system lies in using the FDD system to keep the target system working correctly at all times.

Step 2: Step 2: Perform Time-Series Calculations on Data

The next step is to perform calculations based on the collected and categorized data. In addition to utilizing "collected" data points—those whose values are polled directly from the system being analyzed—the FDD system can perform arbitrary calculations to create "calculated" points that are available for the FDD process.

A calculated point is defined by a mathematical expression detailing the arithmetic operations that are performed against other points (collected or calculated) to determine each value for the calculated point. For example, suppose we have a collected point that was defined in degrees Fahrenheit and we need another point that represents the value of the first point in degrees Celsius. We would create a calculated point based on an expression that might look like:

$$Temp\_Celsius=(Temp\_Fahrenheit-32)/1.8$$

Comparison operators are also allowed in calculated expressions, and produce Boolean results (i.e. are either true or false). An example of a Boolean expression:

$$Freezing=Temp<32$$

Boolean expressions can represent "Symptom Flags". The Boolean expression might be defined to be true when there is a likely fault symptom. This simple symptom flag is similar to what many control systems will display as faults. But this kind of "fault" is typically not useful because:

The flag can come and go. It might be present at certain times and absent at other times. The system does not help the operator understand why the fault comes and goes.

A typical complex system, such as the HVAC system for a large commercial building, might be constantly displaying hundreds of such flags, which are typically ignored because the vast majority are unimportant—i.e. there is not actually a fault (false-positive), the "fault" is not particularly important (the flag definition is likely too simple), or there are many faults being reported that are all the result of a single "root-cause" failure, but the system is incapable of actually identifying the root cause.

The flag may be indicating a condition which might or might not be a fault, which can only be properly determined by analyzing this fault along with other related candidate faults in the same system.

In the FDD system, the symptom flags are merely the starting points for analyzing potential faults.

Symptom flags are often not continuous. That is, the immediate fault being detected by the symptom flag might only occur for a period of time, then not occur, and then occur again. This might be due to the operating mode of the equipment (fault only occurs when the Air Handling Unit fan is on), or external conditions (temperature within a certain range), or not even have an obvious cause (symptom is present from 7 AM to 10 AM each day). For analysis purposes, the FDD system groups recurring symptom flags related to the same piece of equipment or point. This allows us to identify the underlying issue as a single fault instead of polluting the system with repeated faults.

Step 3: Step 3: Convert Symptom Flags to Events

This step creates a data structure called an Event based on the information from Symptom Flags. An Event is a table of time periods during which a symptom flag is present. Whereas Symptom Flags are represented as time-series (i.e. there is a data value for each interval of time), the Event table is a list of the start and end times (note—when we say "time" throughout this document, we mean date and time) during which the symptom flag was present. There is some amount of "de-bouncing" performed at this step. That is, if a Symptom Flag disappears for a selected time period and then reappears, the two "runs" of Symptom Flags are combined into one. The actual time period that is selected to be considered a "short amount of time" for this purpose is an adjustable parameter. For an HVAC system, it would typically be 15 to 20 minutes—usually a single polling interval.

For symptoms that are still occurring (i.e. the Symptom Flag is still true) at the end of the current data, the end time for an event will be "open".

Each Event is assigned an "Event Type". This is essentially a label for the symptom flag. So an Event Type might be "space temperature too low". These Event Types are used later by the Event Cluster Rules.

Step 4: Step 4: Group Events into Event Ranges

This step groups all Events that occur related to a single piece of equipment, of the same Event Type, regardless of how much time passed between occurrences of the event.

New Event Ranges are created with the start time set to the start time of the first Event in the range, and an open end time—even if all the Events in the range have been closed. The end date and time of an Event Range is meant to be set only once the underlying fault has been explicitly acknowledged fixed or a human has explicitly closed the fault. That is, once an Event has been detected and promoted to an Event Range, it is presumed that the underlying symptom(s) should be investigated, even if the symptoms have, for the moment, stopped occurring.

When an Event Range is closed, it is usually because the operator believed the root cause of the symptom has been corrected. Often however, the symptom continues to occur, or re-occurs later in time. There could be a variety of reasons for this: the fix was not correct; the problem was fixed for a while, but occurred again; the problem was never fixed, but the issue was still closed; etc. However, once a given Event Range has been closed, it is never re-opened. Instead a new Event Range is created for the same set of symptoms. Later on, when the events are clustered, there is logic to determine if these new Event Range should cause a prior issue to be re-opened, or a new issue to be created.

Event Ranges inherit the Event Type of the underlying Events in the Event Range, unless the Event Range was created by a Cluster Rules (see below), in which case the type of the Event Range will come from the Cluster Rule.

Step 5: Step 5: Use Cluster Rules to Group Event Ranges into Event Clusters

In this step, Event Ranges are linked using Cluster Rules to form Event Clusters. An Event Cluster is a directed graph (usually a tree, but since there can be loops, it is more accurate to say that an Event Cluster is a directed graph) of links between Event Ranges. Each directed graph constitutes an Event Cluster. All the Event Ranges in a directed graph are members of the Event Cluster.

Cluster Rules represent relationships between symptoms (Event Ranges), and can potentially generate new Event Ranges to represent fault diagnoses. Cluster Rules are defined by templates, and are infinitely extensible. Different libraries of Cluster Rules can be used in different problem domains. For example, analyzing a process control system would use a different set of Cluster Rule templates than an HVAC system.

A cluster rule has a primary rule and one or more secondary rules. Both primary and secondary rules have required and optional properties:

- An "applicable-to" pattern selects the Event Ranges that this rule applies to, using the Pattern Matching feature described previously. The Event Range is selected when the pattern matches that of the equipment or point corresponding to the symptom flag that the Event Range is based on. Note that more than one symptom flag may be matched by the applicable-to pattern.
- An Event Type. Each Event Range must have the same Event Type as the rule in order to match.
- An optional time range function, and threshold value. The time range function, if present, performs comparisons involving the time ranges of all the input Event Ranges being considered by the Cluster Rule. The simplest example would be a time range function that determines the fraction of overlap between the Event Ranges involved—i.e. do these Event Ranges cover the same time period. The threshold is the minimum value required for the Cluster Rule to pass this test. For example, a value of "1.0" might indicate that the Event Ranges have to have precise 100% overlap to pass. (Note: precise 100% overlap would be unlikely to occur in a real-world system.)
- An "isCause" flag. This flag will be set on those rules that are considered the cause of the symptom or fault in question. This determines the direction of the links in the directed graph that constitutes the Event Cluster.
- An "allowCreate" flag. The "allowCreate" flag indicates that, if this cluster rule "fires" (meaning that all primary and secondary rules are evaluated to true), a new Event Cluster will be created. The Event Type of this new Event Cluster will be set from the Event Type of the rule. Note that in this case the rule's Event Type is an output from the rule, rather than a condition of the rule. This Event Cluster can be referred to as a Diagnosis Event Cluster, since it contains the diagnoses for the candidate fault. Rules that do not create Diagnosis Event Ranges just create links between existing event ranges. The rules with the allowCreate flag set can be thought of as determining a possible root cause for a set of symptoms.

Step 5 can be broken down into the following sub-steps:

Step 51: Iterate over all Cluster Rules looking for matches on the "applicable-to" pattern for each rule.

Step 52: If the patterns match, check for matches on all Event Types that do not have the allowCreate flag set.

Step 53: If the Event Types all match, then run the time range function (if present) on all matched Event Ranges to determine if the results of the time range function are equal to or greater than the specified threshold.

Step 54: If the time range function met the threshold, and the allowCreate flag is on, create a Diagnosis Event Range.

Step 55: For all the rules in the current Event Cluster: link all Event Ranges that have the isCause flag set to all Event Ranges that do not have the isCause flag set.

Step 56: Continue with iteration as per rule 51 until all Cluster Rules have been examined.

Step 6: Step 6: Assign Event Cluster a Likelihood Score

Each Event Cluster represents a collection of related symptoms and possible fault diagnoses. The "scoring" process computes the probability that each identified diagnosis is the actual root cause of the Event Cluster. By ranking candidate faults according to probability, the user interface can now be tailored to show the operator the most probable faults first, and those faults whose probability falls below a given threshold might not be shown at all.

The scoring process is as follows:

Each individual Event Range that represents a symptom is assigned a score "score" when the Event Range is created that represents the "likelihood" that the symptom underlying the Event Range represents a fault. This likelihood is the cross product of (note each of these values is a fraction between 0.0 and 1.0 inclusive):

An intrinsic weighting factor assigned to each symptom calculation

The total amount of time the symptom has been present

An weighting factor based on weighted average of the lengths of each Event (i.e. continuous or near-continuous run of symptom flags) in the Event Range Each Cluster Rule that connected Event Ranges in the directed graph also has a weight, a value between 0.0 and 1.0 inclusive, which represents the probability that the Cluster Rule was valid. This weight is generally fixed for each type of Cluster Rule.

The total "likelihood" score can be computed in more than one manner. The simplest scoring method is to sum all Event Cluster links multiplied by the score of each Event Cluster. This would typically be the method used for any given template set working against a given target system.

Step 7: Perform Adjustment to Target System

The result of the steps above is a set of Event Clusters (directed graphs), where each Event Cluster represents a related set of symptoms with one or more diagnoses—information concerning the health of the system, with the end goal being to identify what is "wrong" or sub-optimal about the target system—i.e. the "faults" referred to above. This information can then be used to make adjustments in the target system based on the health information derived from the previous steps.

Operators of the target system can use the fault information to correct and improve the target system. Some examples of this are as follows:

The FDD system detects that the valve controlling chilled water to a cooling coil is leaking. The customer would replace the leaking valve.

The FDD system determines that energy is being wasted by not making sufficient use of outside air for "free cooling" (i.e. cool air that can simply be taken from the outside when the outside temperature is sufficiently low to permit this). The HVAC control system is reprogrammed to take in more outside air.

In a laboratory it is found that fume hoods are being left open longer than necessary, resulting in unnecessary energy consumption and wear on the fume hood fans. The customer institutes a program to remind employees to close fume hoods when they are not actively using them.

In some cases, the FDD system could be integrated with the building control system and actively send commands to the building control system to adjust parameters in the target system. For example, in the "free cooling" case, the system could dynamically adjust the vent that controls how much outside air is admitted.

Figure 2:
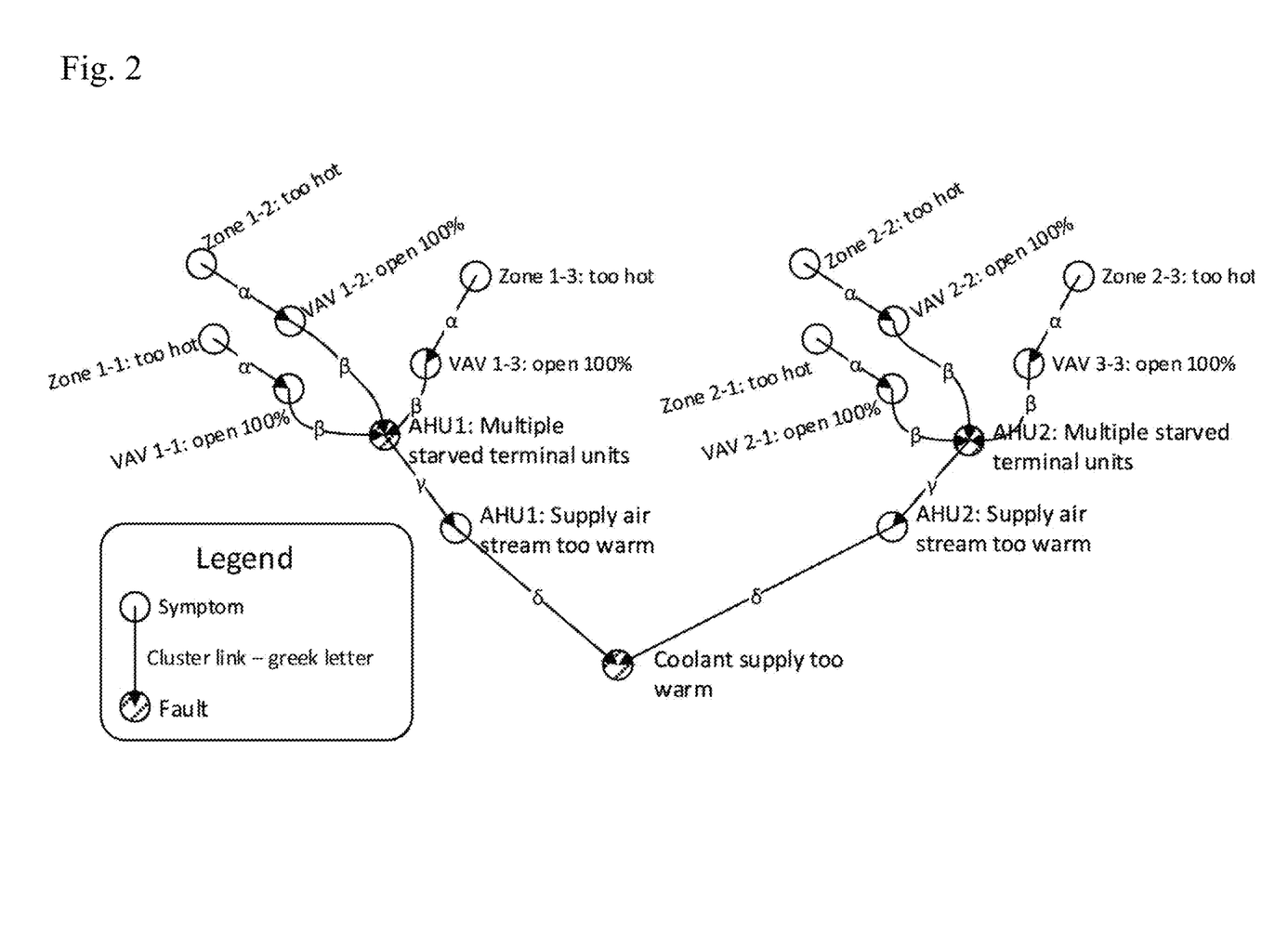
FIG. 2 is an illustration of an example fault cluster

FIG. 2 is a diagram representing an example Event Cluster. There are different kinds of symptoms of faults in this graph, from the top to the bottom:

| Symptom or fault | Which? | Description |
|---|---|---|
| Zone n-n: too hot | Symptom | The symptom here is simply that the space (zone) is not staying at (or close enough to) the programmed temperature set point. We know this because there is at least one thermostat in the zone giving us the temperature and we know what temperature the system is supposed to be maintaining for this zone. |
| VAV n-n: open 100% | Symptom | The damper for the Variable Air Volume unit is open 100% - presumably because the control system, in response to the space being too warm, is attempting to supply as much cool air as possible to the space. If the VAVs were not open 100%, the fault diagnosis would possibly change (likely to a control system programming error). |
| AHUn: Multiple starved terminal units | Fault | There are three or more terminal units (i.e. VAVs) connected to this air handling unit (AHU), which are showing the above "VAV open 100%" symptom. This is strong evidence that the VAV symptom has a common root cause - the AHU they are connected to. |
| AHUn: Supply Air too warm | Symptom | The air stream being supplied by the AHU is warmer than specified. |
| Chilled water supply too warm | Fault | The coolant supply (presumably coming from a common central chiller) is too warm for the AHUs to effectively maintain their specified supply air temperature |

These symptoms and faults have been linked using the following cluster rules:

| Cluster Rule | Primary Rule | Secondary Rule or generated fault | Which |
|---|---|---|---|
| α | Failure to maintain set point temperature (too warm) | VAV Damper open 100% ("At Capacity") | Rule |
| β | Three or more terminal units at capacity | Multiple starved terminal units | Fault |
| γ | Multiple starved terminal units | Supply air stream too warm | Rule |
| δ | Supply air stream too warm | Coolant supply too warm | Fault |

The fault graph could be further extended with more symptoms and rules to uncover the reason(s) why the coolant (usually water) that the chiller is supplying is too warm—presumably there is an issue in the central plant. To keep this example simple, we have chosen to stop at the building perimeter, but in a campus where the central plant is being monitored, the FDD system would certainly be capable of tracing this fault through to the central plant to diagnose why the chiller is not producing sufficiently chilled coolant.

The net result in this example is that the operator can be presented with one root cause—"coolant supply too warm"—instead of fourteen or more red lights on the operator console. Of course, the underlying information about the fourteen systems is still there—if the operator wishes to trace the root fault down to each symptom. But the intention is that the user interface would first present root causes and only present the rest of the detailed symptoms if the operator so desired. Simple, actionable, information is more useful than a screen full of flashing red alarm indicators.

Usage

The net result of the FDD process is a set of Event Clusters, each containing a list of fault diagnoses ranked by probability. This list can be presented to an operator for action—presumably showing the most probable diagnoses first. It would also be sensible to filter probable faults and only present faults above a certain probability to the operator.

The operator needs to have the capability of "closing" Event Clusters. Recall that the FDD system never, by itself, sets the end time for Event Ranges (and therefore implicitly never "closes" the Event Clusters that include those Event Ranges). This is based on the theory that, even if the symptoms of the probable fault are no longer occurring, it is very likely that the underlying fault still exists. The symptoms may have stopped occurring because of other conditions—for example, in an HVAC system, perhaps the season has changed and the target system is no longer cooling. Therefore, only the operator can "close" an Event Cluster, and thereby set the end time for all the Event Ranges in the Event Cluster.

An "issue" management system could be built on top of the FDD system that would include the user interface to present and manage the probable faults discovered by the FDD system. The presumption is that each Event Cluster represents a probable "issue" to be investigated. The issue management system would have a user interface to allow the operator to filter, sort, and perform other operations helpful in managing the discovered issues. Such a system would presumably include the ability to close issues (and the corresponding Event Cluster), but might also include other operations. For example, suppressing the presentation of the issue without actually closing it.

The fault detection process is designed to be run periodically, as often as necessary. For HVAC systems, this could be daily, or even hourly. For faster acting systems like an engine, the process could be run much more frequently. The system is designed to be "stable". Running the detection process repeatedly merely updates (if necessary) existing Event Ranges, Event Clusters, etc. and does not create new Event Ranges or Clusters for the same symptoms.

However, it is also possible to run the process as needed—even once-only against a snapshot of data from the target system. The only requirement is that there be a reasonable amount of historical data—presumably at least a few days' worth for an HVAC system, for the analysis to be meaningful.

Definitions

FDD System: The automated fault detection and diagnosis system described herein shall be referred to as the "FDD system".

Target System: The FDD system is distinguished from the system being analyzed (e.g. the HVAC or industrial process control system, or the engine, etc.), which we will refer to as the "target" system.

Fault: For brevity, this text also uses an expansive definition of the word "fault". Whereas "fault" might be used to describe an obvious malfunction (for example, a valve that is not responding to commands to open or close), in this document we will use it to refer to any condition that might be improved. This would include sub-optimal operating states that waste energy or cause needless wear and tear on equipment.

Points: A single value from a sensor is called a "point". A point might be a temperature, a pressure, a status (on or off), a position (percent open), a velocity (for media flow or fan speed), etc.; it could also be an operational parameter, such as a temperature set point indicating the desired temperature at some location. Note that a single piece of equipment will likely have more than one point associated with it. For example, in HVAC a Variable Air Volume terminal unit would at least have a point for the temperature of the zone which it feeds, and another point for the position of the valve controlling the air flow. More complex pieces of machinery might contain forty or fifty points, or a simple piece of equipment (for example, a standalone fan) might report just one point.

Sample: A single readout from a point is called a sample.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method for automated detection of ultimate faults in a multiple component control system, the method comprising:
    a) collecting data from each sensor among a plurality of sensors, each of the plurality of sensors corresponding to a respective one of the multiple components within the control system;
    b) performing a separate set of time-series calculations on the data collected from each of the sensors;
    c) converting results of each set of time-series calculations into a plurality of events;
    d) applying first generated sets of cluster rules stored in a database of a fault detection system, each first generated set of cluster rules being associated with similar sets of events to link together the similar sets of events into respective event ranges and to link together the respective event ranges to form an event cluster at a common fault, and a second generated set of cluster rules stored in the database, the second generated set of cluster rules being associated with the formed event cluster and at least one similar event to link together the event cluster and the at least one similar event into respective second event ranges and to link the respective second event ranges to form an event cluster at a common fault: and
    e) applying additional generated sets of cluster rules associated with a respective formed event cluster and at least one similar event to link together the respective event clusters and the at least one similar event into respective additional event ranges and to link the additional event ranges to form an event cluster at a new common fault until an ultimate fault diagnosis is determined.

2. The method of claim 1, in which step (a) comprises the steps of:
  polling the plurality of sensors at periodic intervals to retrieve a plurality of sensor data points; and
  storing the plurality of sensor data points in a database, each sensor data point being marked with a time stamp.

3. The method of claim 1, in which step (c) further comprises the step of de-bouncing comprising combining pairs of events which occur within a selected time period.

4. The method of claim 1, in which step (c) further comprises assigning an event type to each of the plurality of events.

5. The method of claim 4, in which step (d) comprises grouping events which occur related to a single piece of equipment and are of the same event type into an event range.

6. The method of claim 1, in which the event ranges of step (d) are created with a start time set to a start time of the time stamp of a first data point of the first event in the event range.

7. The method of claim 6, further comprising the step of setting an end time when a fault has been fixed or closed.

8. The method of claim 1, in which step (e) comprises the steps of:
  i) looking for matches between an applicable-to pattern for a cluster rule and the plurality of event ranges;
  ii) if a match is found in step (i), check for matches on all event types that do not have an allowCreate flag set;
  iii) if the event types all match and a time range function is present for the cluster rule, then run the time range function on all matched event ranges, and if a result of the time range function is equal to or greater than a specified threshold, and the allowCreate flag is on, create a diagnosis event range;
  iv) for all the rules in an event cluster, link all event ranges that have an isCause flag set to all event ranges that do not have the isCause flag set; and
  v) repeat the step from step (e)(i) until all cluster rules have been examined.

9. The method of claim 1, wherein the similar sets of events correspond with a set of events of respective components within one device or one zone of the system matching with another set of events of respective components within another device or zone of the system.

10. The method of claim 9, wherein the Events include a low or high temperature, a faulty fan speed, a low or high humidity, a low or high air flow and the position of a component.

11. The method of claim 1, wherein the cluster rules are analysis templates created to represent relationships between events, event ranges and event clusters.

12. The method of claim 1, wherein the sensors collect data at predetermined intervals according to the system.

13. A fault detection system for a multiple component control system, the fault detection system comprising:
  a) a plurality of sensors, each sensor corresponding to at least one of the plurality of components to detect a status of the corresponding component;
  b) a fault detection and diagnostics device coupled to each of the plurality of sensors, the fault detection and diagnostics device comprising:
  a memory including at least one database configured to store a plurality of cluster rules in the form of pattern analysis templates;
  one of more processors being configured:
  to collect the status data from each of the sensors of the corresponding component, the data collected from each sensor being performed in integrals specific to the corresponding component, and to perform a separate set of time-series calculations for the data collected from each sensor;
  to convert the results of each set of time-series calculations into a plurality of events;
  to apply first generated sets of cluster rules, each first generated set of cluster rules being associated with similar sets of events to link together the similar sets of events into respective event ranges and to link together the respective event ranges to form an event cluster at a common fault, and a second generated set of cluster rules, the second set of cluster rules being associated with the formed event cluster and at least one similar event to link together the event cluster and the at least one similar event into respective second event ranges and to link the respective second event ranges to form n event cluster at a common fault, and
  to apply additional generated sets of cluster rules associated with a respective formed event cluster and at least one similar event to link together respective event clusters and the at least one similar event into respective additional event ranges and to link the additional event ranges to form an event cluster at a new common fault until a final fault diagnosis is determined.

14. The system of claim 13, wherein the multiple component control system further comprises:
  a building control system, wherein the fault detection system further comprises program instructions stored on at least one storage device for execution by at least one of the one or more processors to send commands to the building control system to adjust parameters in the complex engineered system.

* * * * *